(12) United States Patent
Perry et al.

(10) Patent No.: US 6,731,640 B1
(45) Date of Patent: May 4, 2004

(54) FRAME SYNCHRONIZATION OVER MULTIPLE NETWORKS

(75) Inventors: Mark J. Perry, Cary, NC (US); Patrick J. Dagert, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/567,630

(22) Filed: May 9, 2000

(51) Int. Cl.[7] .............................. H04L 12/56; H04J 3/06
(52) U.S. Cl. .................... 370/395.6; 370/401; 370/509; 714/775
(58) Field of Search ................................. 370/357, 397, 370/395.5, 395.62, 230, 400, 442, 401, 469, 468, 474, 476, 511, 512, 509, 395.6; 375/359, 368; 714/701, 798, 775, 774

(56) References Cited

U.S. PATENT DOCUMENTS

| 4,344,180 A | * | 8/1982 | Cummiskey | 375/116 |
| 6,208,654 B1 | * | 3/2001 | Moteki et al. | 370/395 |
| 6,498,794 B1 | * | 12/2002 | Tsukamoto et al. | 370/395.1 |
| 6,522,629 B1 | * | 2/2003 | Anderson, Sr. | 370/236 |

* cited by examiner

*Primary Examiner*—Duc Ho
(74) *Attorney, Agent, or Firm*—Withrow & Terranova, PLLC

(57) ABSTRACT

The present invention enhances synchronization when frames are transmitted over an intermediate network by incorporating a synchronization code along with a data frame in a transport frame used to transport the data frame over an intermediate network. The synchronization code is generated and used to check framing and correct framing errors when the data frames are extracted from the transport frames.

32 Claims, 5 Drawing Sheets

FRAME SYNCHRONIZATION OVER MULTIPLE NETWORKS

FIELD OF THE INVENTION

This invention generally relates to frame synchronization, and particularly relates to synchronization of frames that are transported over an intermediate network.

BACKGROUND OF THE INVENTION

Given the ever-increasing demands for voice, data, and multimedia communications, corporations are continuing to take advantage of the high-speed digital communications of the T Carrier systems. The most prominent carrier system is the T1. A T1 describes the physical layer interface to a provider network. Once the T1 carrier is in place and terminated, a customer may generate traffic. The digital signal transmitted over a T1 is referred to as digital signal level one (DS1). DS1 operates at a digital signaling rate of 1.544 Mbps.

DS1 traffic is arranged in fixed-length frames, wherein each frame consists of 193 bits of information created in 125 μseconds. One bit is used for framing and the other 192 bits are used for customer traffic. The 192 bits could be data or 24 eight-bit voice channels.

For DS1 to be useful, synchronization must be maintained. Synchronization is the process that forces the receiver and transmitter to agree upon timing between the two. The receiver samples the incoming bit-stream and checks the framing bits, looking for known patterns. Sometimes synchronization is referred to as frame synchronization or alignment. Importantly, the framing bits play a key role in maintaining synchronization of frames, and any loss or corruption of a framing bit may lead to a loss of synchronization. Maintaining synchronization of the transmitted data is important to minimize data loss and corruption, as well as to maintain the circuit connection between the communicating endpoints. Typical DS1 framing and formatting is shown in FIG. 1.

In the past, DS1 traffic was carried entirely over traditional time division multiplexing (TDM) networks. There is now a movement to carry DS1 traffic over ATM (Asynchronous Transfer Mode) networks. ATM is a connection-oriented, packet-switching network technology that uses fixed-size cells to carry data. ATM requires that all cells be the same size to enable faster switching and relay across ATM switches, which make up the ATM network. Each ATM cell is 53 octets long, including a 48-octet payload preceded by a 5-octet header. Notably, other octets of the 48-octet payload may be used for the ATM adaption layer, which facilitates mapping data into and extracting data from a cell. For example, AAL1 (ATM Adaption Layer 1) has been commonly used to carry circuit switched voice information. An emerging AAL1 use is circuit emulation for carrying DS1. AAL1 uses one octet out of the 48-octet payload.

When carrying DS1 traffic over an ATM network, there is an increased risk that the ATM cells carrying the DS1 frames will periodically be lost. Any loss of cells will cause a loss of synchronization. Further, the use of ATM requires additional data manipulation and processing, such as mapping one or more DS1 frames into an ATM cell, removing the DS1 frames from the cell, and reassembling the DS1 frames for transport. This increase in data manipulation and processing increases the likelihood that the data within the frame, and in particular, the framing bits used for synchronization, will be lost or corrupted.

The synchronization techniques built into the DS1 signaling format fail to address the increased risk of signaling loss when DS1 frames are transmitted over an ATM network. Therefore, there is a need to minimize the risk of losing synchronization of data frames transmitted from one network to another over an intermediate network.

SUMMARY OF THE INVENTION

The present invention addresses the need for enhancing synchronization when frames are transmitted over an intermediate network by incorporating a synchronization code along with a data frame in a transport frame used to transport the data frame over an intermediate network. The synchronization code is generated and used to check framing and correct framing errors when the data frames are extracted from the transport frames.

The synchronization code associated with a given data frame may include the framing bits for other data frames wherein the synchronization code or codes from a first data frame is used to correct the framing bit for a second data frame. The synchronization code may also include redundant framing bits for the associated data frame. These redundant bits are used to check and correct the actual framing bit for the associated data frame.

The synchronization code may also include a sequence number within a sequence of numbers to identify lost data frames. The lost data frames may be replaced with a filler frame having a framing bit to maintain synchronization. The filler frame will not have the actual data for the data frame, but will importantly allow the recipient to receive the proper number of frames and maintain synchronization. Other aspects and features of the present invention will become apparent to those skilled in the art.

BRIEF DESCRIPTION OF THE DRAWING FIGURES

Figure 6:
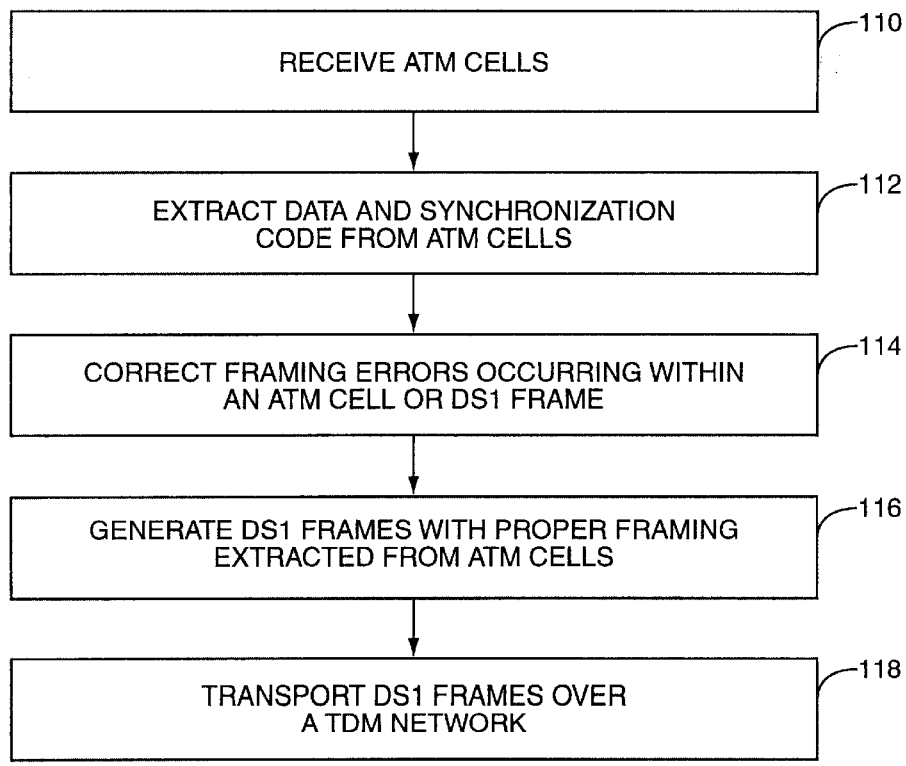

FIG. 6 outlines the basic process of correcting framing errors according to the present invention.

Figure 7:
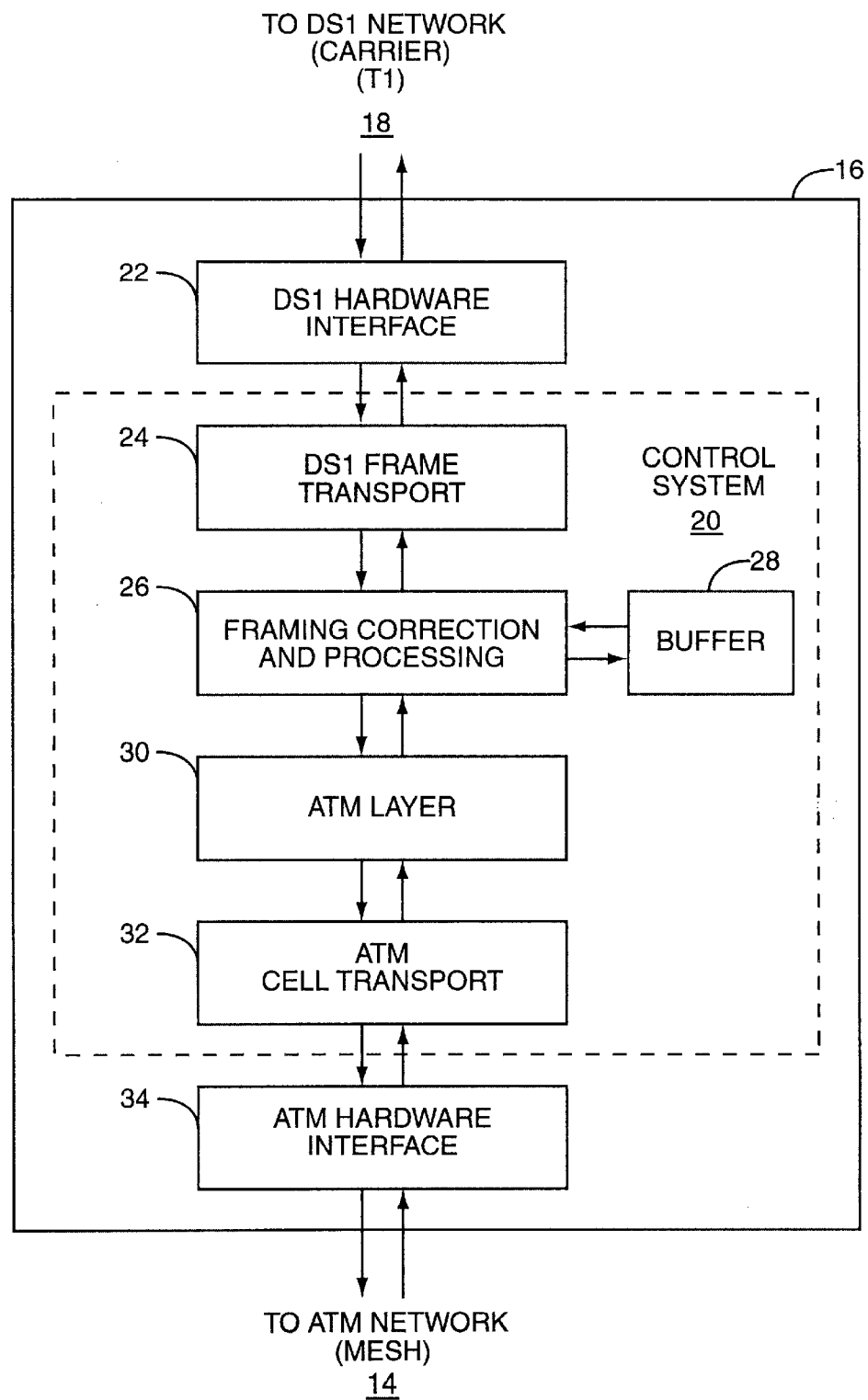

FIG. 7 is a block representation of a media gateway constructed according to the present invention.

Figure 8:
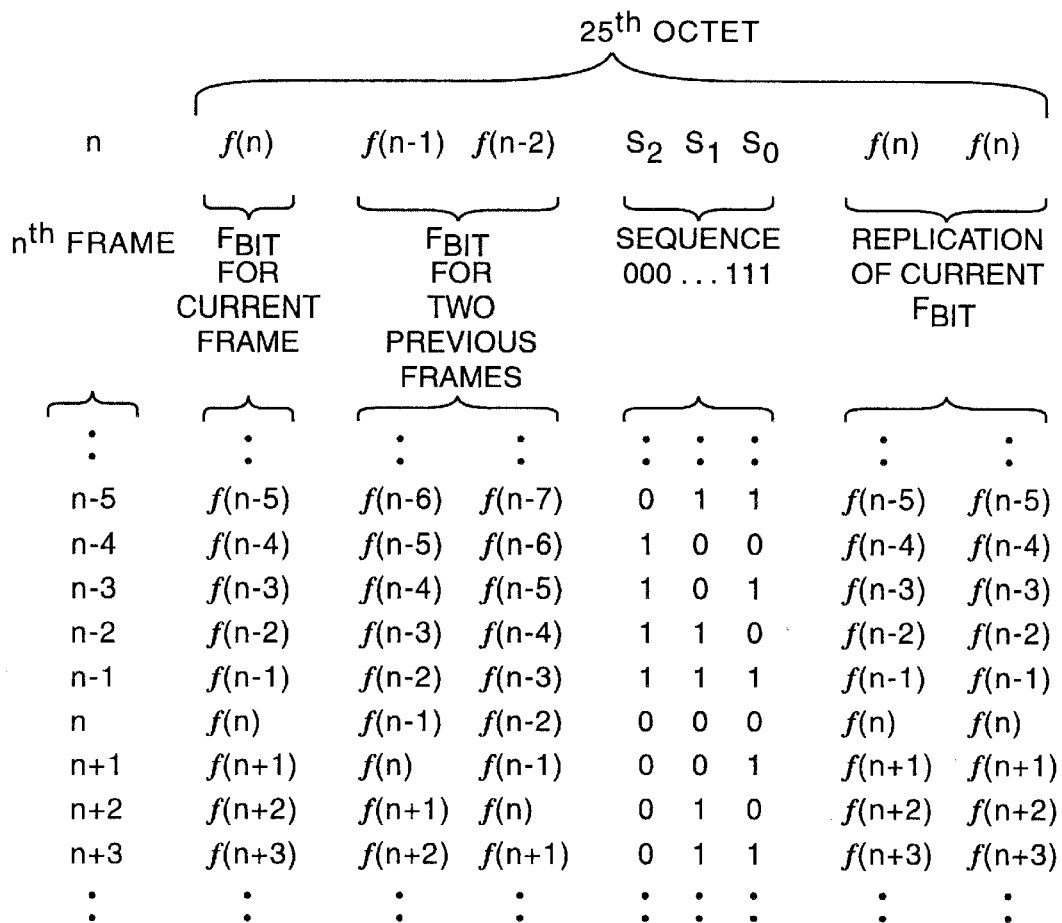

FIG. 8 is a chart outlining an exemplary synchronization coding sequence according to the present invention.

DETAILED DESCRIPTION OF THE PREFERRED EMBODIMENTS

The present invention facilitates improved frame synchronization when data frames are transmitted from one network to another over an intermediate network. Although the preferred embodiments of the invention relate to carrying DS1 frames over an ATM network, the inventive concepts are applicable to a variety of networking configurations and technologies wherein frames of data in one network are transported in frames or cells over a second network using a different network technology. The invention is particularly useful when the first network technology includes framing information in fixed-length frames of one length and maps those frames into fixed-length frames having a different length for transport over the second network.

Figure 1:
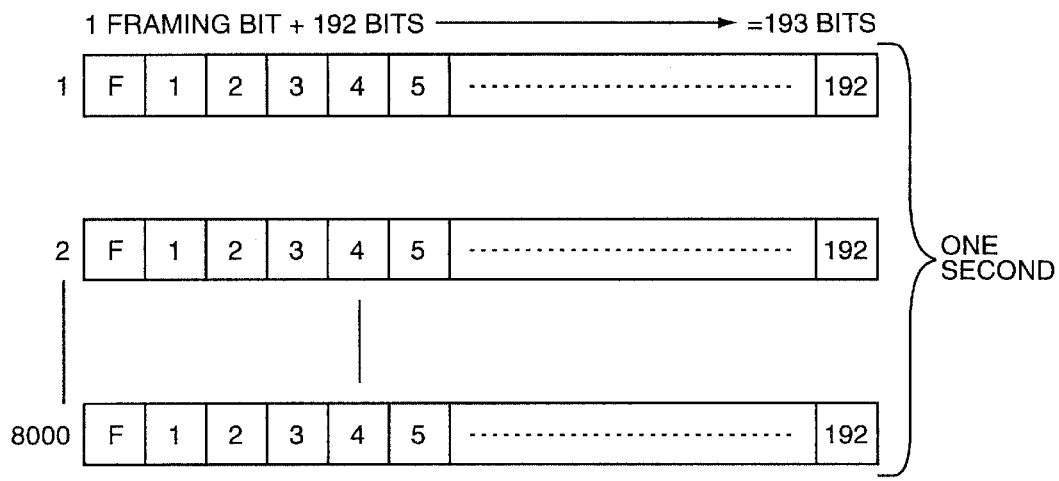
FIG. 1 is a representation of DS1 framing.
Figure 2:
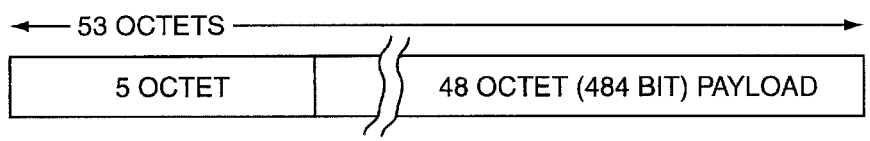
FIG. 2 is a representation of an ATM cell.
Figure 3:
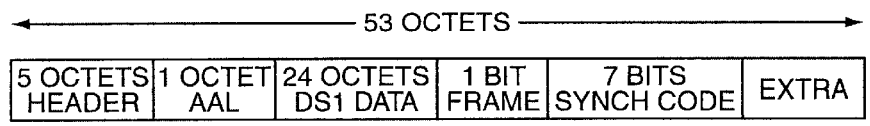
FIG. 3 is a representation of an ATM cell including DS1 data from a DS1 frame, a framing bit for the DS1 frame, and a synchronization code.

At the heart of the present invention is the placement of a synchronization code along with a DS1 frame in the payload of an ATM cell. During extraction of the DS1 frame, the synchronization code is used to correct corrupted framing bits or to replace lost frames, either of which may be used alone or in combination with one another. For the description of the preferred embodiments, exemplary mapping of the ATM cell is shown in FIG. 3. The ATM cell includes a 5-octet header and one octet of payload dedicated to the ATM adaption layer. The remaining 47 octets of payload are preferably mapped with 24 octets of data from a DS1 frame followed by one octet including the framing bit for the associated DS1 data and a synchronization code having seven bits. Notably, the frame may be part of or separate from the synchronization code. The synchronization code may include any number of bits capable of fitting in the unused portion of the cell's payload. The synchronization code, its creation and use are discussed in detail below.

Figure 4:
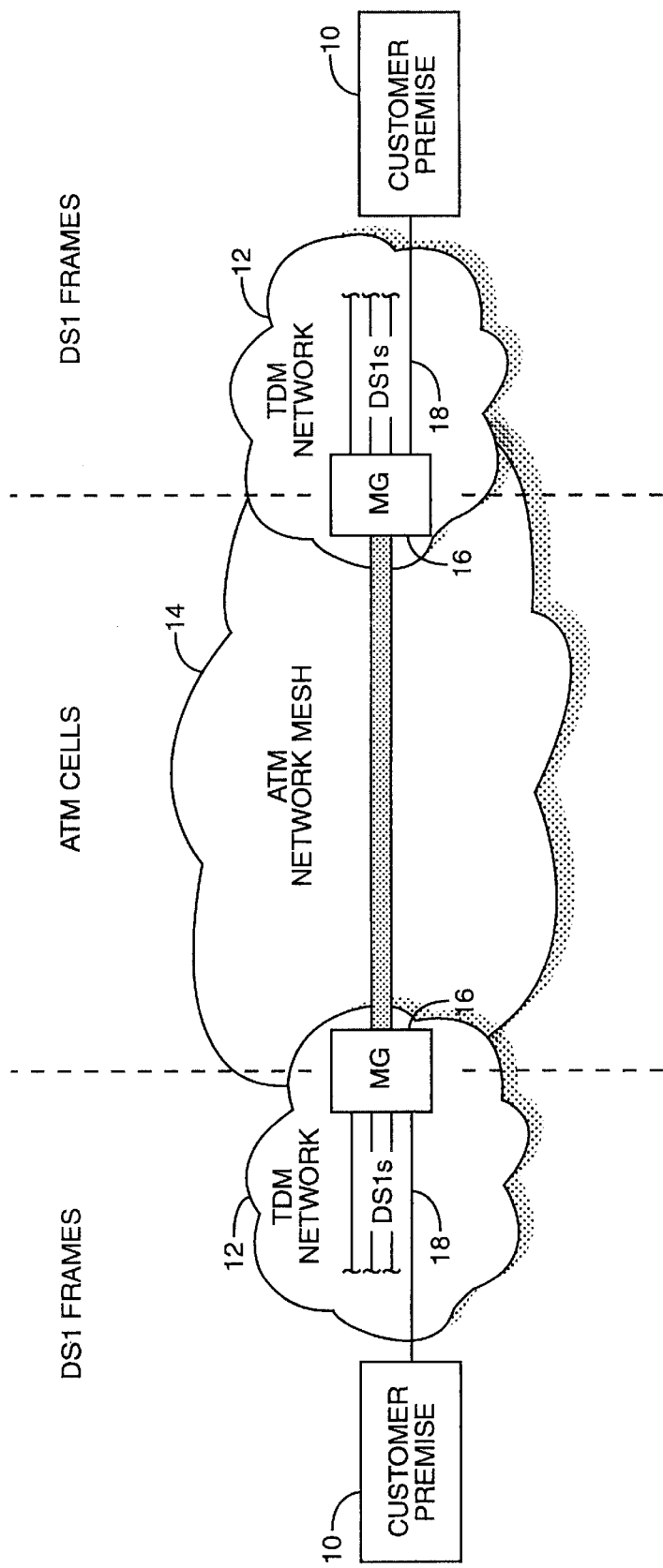
FIG. 4 is a representation of two TDM networks coupled via an ATM network.

Turning now to FIG. 4, information is passed between customer premises 10 over two time-division multiplexing (TDM) networks 12 that are connected by an ATM network 14. The connection of the ATM network 14 to either one of the TDM networks 12 is facilitated by a media gateway 16. Each media gateway 16 is preferably coupled to the ATM network switching mesh as well as to DS1 carriers 18, such as T1s. The DS1 carriers ultimately connect each media gateway 16 to the corresponding customer premise 10. Notably, the TDM networks 12 and ATM network 14 are typically made up of smaller networks coupled together with any number of switches, routers, bridges, or relays.

The ATM network consists of multiple switches interconnected to form the switching mesh. The mesh operates like a single network that allows any termination, such as the gateway 16, to communicate with any other termination. For additional information, attention is directed to *Nortel Networks: The Complete Reference*, James Knapp, Osborne/McGraw/Hill, 1999 and *Broadband Telecommunications Handbook*, Regis J. "Bud" Bates, McGraw-Hill, 2000, the disclosures of which are incorporated herein by reference.

In operation, DS1 frames are received over a DS1 carrier 18 from a customer premise 10 at one media gateway 16. The DS1 frames are mapped into ATM cells and transferred across the ATM network over a virtual circuit to the other media gateway 16. ATM is a connection-oriented technology, which requires communicating devices to establish a virtual circuit through the network before data is transferred. Once ATM cells are transferred over the virtual circuit of the ATM network from one media gateway 16 to another, the ATM cells are processed to extract the DS1 frames. The DS1 frames are assembled as necessary and transferred over the proper DS1 carrier 18 to the appropriate destination (i.e. customer premise 10).

Figure 5:
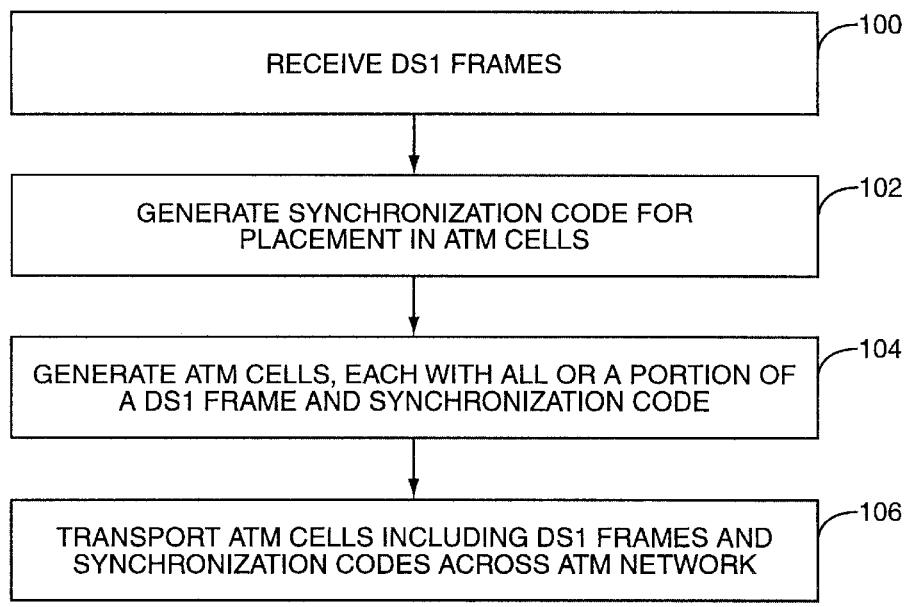
FIG. 5 is a flow chart outlining the basic process of generating synchronization codes according to the present invention.

With particular reference to FIG. 5, DS1 frames are received (block 100) at the media gateway 16. Upon receipt, the DS1 frames are processed and a synchronization code is generated (block 102) for placement in each ATM cell. ATM cells are generated, each including a DS1 frame and a synchronization code (block 104). The ATM cells are transported (block 106) across the ATM network 14 to a remote media gateway 16. The synchronization code is adapted to correct framing errors when ATM cells carrying DS1 frames are processed to recover DS1 frames at the remote media gateway 16.

Turning now to FIG. 6, at the opposite end of the ATM network 14, the ATM cells are received (block 110) at the remote media gateway 16. A DS1 frame and the synchronization code are extracted from each ATM cell (block 112). Based on the recovered frame and synchronization code, framing errors are corrected for the DS1 frames transported within those cells (block 114).

The synchronization code in one ATM cell may be used to correct framing errors in data frames transported in other ATM cells arriving before or after the ATM cell from which the synchronization code was extracted. The synchronization code may also be used to replace lost DS1 frames with a filler frame to maintain synchronization. The filler frame will not have the data of the lost DS1 frame, but will include the proper number of information bits, and most importantly, the framing bit required to maintain synchronization.

The amount of framing correction available is dependent upon the amount of overhead allocated to the synchronization code and how the error correction code was generated. Next, DS1 frames are reassembled (block 116) and transported to their ultimate destination over the DS1 carrier 18 of the TDM network (block 118).

As indicated, the transport of DS1 frames over an ATM network is preferably facilitated using a media gateway 16, such as that diagrammed in FIG. 7. Those of ordinary skill in the art will recognize that the depiction of the media gateway 16 in FIG. 7 is a block representation of select hardware and software applications as they relate to the mapping of DS1 frames into ATM cells, and vice versa.

Those skilled in the art will recognize that various gateway, router and switch configurations and combinations may function as a media gateway, and should be considered within the scope of the disclosure. Additional information for these products is available from Nortel Networks.

The media gateway 16 will include a control system 20 having the necessary processing and memory capability to operate and control the various aspects of the gateway. As depicted, the media gateway 16 receives DS1 frames from a DS1 carrier 18 through a DS1 hardware interface 22. A DS1 frame transport 24 moves the DS1 frames from the DS1 hardware interface 22 to a framing correction and processing application 26, which may include hardware, firmware, software or a combination thereof. Depending on the synchronization code function, a buffer 28 may be necessary in order to store multiple DS1 frames when generating the synchronization code (and for facilitating framing correction when cells are received as described below).

An ATM adaption layer 30 receives the DS1 frames and synchronization codes from the framing correction and processing application 26 and generates ATM cells. An ATM cell transport 32 is used to transfer the ATM cells to the ATM hardware interface 34, which is connected to the ATM network 14. The ATM hardware interface 34 may be an ATM switch, which is coupled to other ATM switches within the ATM network 14.

Preferably, the media gateway 16 not only processes DS1 frames into ATM cells, but also receives ATM cells including a DS1 frame and a synchronization code. As such, ATM cells arrive from the ATM network 14 at the ATM hardware interface 34. The ATM cell transport 32 forwards the ATM cells to the ATM adaption layer 30, which extracts data from the incoming ATM cells. The extracted data will include all or a portion of a DS1 frame and a synchronization code. Framing errors occurring in the DS1 frames are corrected using the synchronization code, and the DS1 frames with corrected framing bits are forwarded to the DS1 hardware interface 22. The DS1 frames are then sent across the DS1 carrier 18 to the proper destination.

Turning now to FIG. 8, an exemplary synchronization code is shown. The depicted synchronization code preferably includes or is associated with the framing bit for the associated DS1 frame as the first bit in an octet. Preferably, during processing, the framing bit is stripped off of the DS1 frame and placed as the first bit in the 25$^{th}$ octet of the ATM cell payload. The first 24 octets of the payload after the ATM adaption layer are filled with the 192 bits of data for the DS1 frame.

For any given frame n, f(n) represents the framing bit for the nth frame. Continuing with our example, the second and third bits of the 25$^{th}$ octet include the framing bits for the two previous frames f(n−1) and f(n−2). Including the framing bits for other frames allows the gateway to use the synchronization code in a first frame to check the framing bit for a second frame. When the synchronization code includes framing bits for multiple frames other than the current frame, the framing bit being processed may be compared with expected values received in one, two or more ATM cells. In the given example, the framing bit for the nth frame is repeated in the n+1 frame and the n+2 frame. The redundancy of the nth framing bit in separate frames allows for more robust framing checking and correction.

The synchronization code may also include one or more redundant framing bits. Preferably, two or more redundant framing bits are used to enable the gateway to compare the received framing bit with the multiple redundant framing bits and to determine whether or not there is a framing bit error. The gateway may set the framing bit to a majority value of the framing bit and the redundant framing bits. For example, if the actual framing bit is a zero and the two redundant framing bits are ones, the framing bit for the corresponding DS1 frames will be set to one. If the framing bit is a zero, one redundant framing bit is a zero and the remaining redundant framing bit is a one, the actual framing bit will be left as a zero.

The synchronization code may also include a sequence number wherein the sequence number identifies the position of the DS1 frame in a sequence of frames. For example, if the fourth, fifth, and sixth bits in the 25$^{th}$ octet are used to count from zero (000) to seven (111), every DS1 frame transmitted will have an associated sequence number in the synchronization code. The sequence number is used to determine whether or not a DS1 frame was lost during transport. For example, if the gateway receives frames two three five and seven, the gateway can determine that frame four was lost and generate a filler frame to maintain order and synchronization of the DS1 frames when sent to their final destination.

Those of ordinary skill in the art should recognize that the synchronization code may include the framing bit, or simply stand alone and be a function thereof. The preferred embodiment only maps the framing bit into the 25$^{th}$ octet of the payload to keep the 24 octets of data in an even number of octets. Further, the synchronization code may include any one or combination of the above-described techniques for enhancing synchronization. For example, the synchronization code may simply be one or more redundant values for the associated framing bit. Alternately, the synchronization code may only include a sequence number. Importantly, other methods of keeping track of a framing bit value will occur to those of ordinary skill in the art upon reading the above description, and should be considered within the scope of the present invention and the claims that follow.

What is claimed is:

1. A system for enhancing frame synchronization comprising a control system adapted to receive from a first network data frames including a framing bit and data and to generate synchronization codes and form transport frames encapsulating data frames and synchronization codes for transport over a second network to a third network, said synchronization codes generated to facilitate synchronization of data frames extracted from said transport frames and sent over the third network.

2. The system of claim 1 wherein each said synchronization code includes at least one redundant framing bit identical to the framing bit associated with the encapsulated data frame.

3. The system of claim 1 wherein each said synchronization code includes a plurality of redundant framing bits identical to the framing bit associated with the encapsulated data frame.

4. The system of claim 1 wherein each said synchronization code includes a framing bit from a second data frame.

5. The system of claim 4 wherein each said synchronization code further includes a framing bit from a third data frame.

6. The system of claim 1 wherein each said synchronization code includes framing bits from a plurality of data frames.

7. The system of claim 1 wherein each said synchronization code includes at least one redundant framing bit identical to the framing bit associated with the encapsulated data frame and at least one framing bit from another data frame.

8. The system of claim 1 wherein each said synchronization code includes a sequence number in a sequence of numbers to identify a position of the encapsulated data frame in a series of data frames.

9. The system of claim 1 wherein the data frames arm DS1 frames and the first network is a TD4 network for carrying DS1 frames.

10. The system of claim 9 wherein said DS1 frames are framed using an Extended Superframe Format.

11. The system of claim 1 wherein said transport frames are ATM cells and the second network is an ATM network.

12. The system of claim 1 wherein the data frames are DS1 frames and the first network is a TDM network for carrying DS1 frames and said transport frames are ATM cells and the second network is an ATM network.

13. The system of claim 1 wherein said system is within a gateway adapted to couple the first and second networks.

14. The system of claim 13 wherein said gateway includes a DS1 interface adapted to receive DS1 frames from the first network and an ATM interface adapted to send ATM cells over the second networks the data frames being configured as DS1 frames and the transport frames configured as ATM cells.

15. The system of claim 1 wherein said control system is further adapted to receive transport frames from the second network; extract received data frames, framing bits for the received data frames and synchronization codes; monitor at least one synchronization code to correct framing bits for the received data frames; and assemble data frames with a framing bit for transport over the first network.

16. The system of claim 1 wherein said control system is further adapted to receive transport frames from the second network; extract received data frames, framing bits for the received data frames and synchronization codes; monitor at least one synchronization code to determine if a frame was lost; create a filler frame with a framing bit; and assemble data frames with a framing bit for transport over the first network.

17. A system for enhancing frame synchronization comprising a control system adapted to receive from a second network transport frames encapsulating data frames and synchronization codes; precess framing bits associated with the data frames using the synchronization codes to correct framing errors associated with the data frames; and assemble data frames with a framing bit for transport over a first network.

18. The system of claim 17 wherein each said synchronization code includes at least one redundant framing bit identical to the framing bit associated with the encapsulated data frame and said control system is adapted to compare the redundant framing bit with the framing bit for the data frame and correct the framing bit when assembling the data frames for transport over the first network.

19. The system of claim 17 wherein each said synchronization code includes a plurality of redundant framing bits identical to the framing bit associated with the encapsulated data frame and said control system is further adapted to compare the redundant framing bits with the framing bit for the data frame and change the framing bit if the framing bit differs from a majority of the redundant framing bits.

20. The system of claim 17 wherein each said synchronization code includes a framing bit from a second data frame and said control system is adapted to determine an expected value of the framing bit for the second data frame from a synchronization code associated with a first data frame; compare the expected value with a framing bit for the second data frame; and convert the framing bit for the second data frame if it is not the expected value.

21. The system of claim 17 wherein each said synchronization code includes framing bits from a plurality of data frames and said control system is adapted to determine the expected value of a first framing bit for a first data frame from a series of synchronization codes associated with a series of data frames; compare the expected value of the first framing bit with the framing bit for the first data frame; and correct the first framing bit if it is not the expected value.

22. The system of claim 17 wherein each said synchronization code includes a sequence number in a sequence of numbers to identify a position of the encapsulated data frame in a series of data frames and said control system is adapted to receive a series of synchronization codes associated with a series of data frames; monitor the sequence number for each data frame; and create a filler frame for data frames corresponding to missing sequence numbers.

23. The system of claim 17 wherein the data frames are DS1 frames and the first network is a TDM network for carrying DS1 frames.

24. The system of claim 23 wherein said DS1 frames are framed using Extended Superframe Format.

25. The system of claim 17 wherein said transport frames are ATM cells and the second network is an ATM network.

26. The system of claim 17 wherein the data frames are DS1 frames and the first network is a TDM network for carrying DS1 frames and said transport frames are ATM cells and the second network is an ATM network.

27. They system of claim 17 wherein said system is within a gateway adapted to couple the first and second networks.

28. The system of claim 27 wherein said gateway includes a DS1 interface adapted to receive DS1 frames front the first network and send ATM cells over the second network, the data frames being configured as DS1 frames and the transport frames configured as ATM cells.

29. A computer readable media comprising software adapted to instruct a computer to receive data frames including a framing bit and data from a first network; generate synchronization codes; and form transport frames encapsulating data frames and synchronization codes for transport over a second network to a third network, said synchronization codes generated to facilitate synchronization of data frames when extracted from said transport frames and sent over the third network.

30. A computer readable media comprising software adapted to instruct a computer to receive, from second network, transport frames encapsulating data frames and synchronization codes; process framing bits associated with the data frames using the synchronization codes to correct framing errors for the data frames; and assemble data frames with a framing bit for transport over a first network.

31. A method for enhancing frame synchronization comprising:
a) receiving data frames including a framing bit and data from a first network;
b) generating a synchronization code;
c) forming transport frames encapsulating data frames and synchronization codes;
d) sending the transport frames over a second network to a third network;
e) the synchronization codes generated to facilitate synchronization of the data frames when extracted from the transport frames and sent over the third network;
f) receiving transport frames from the second network;
g) extracting received data frames, framing bits, and synchronization codes from the received transport frames;
h) correcting framing errors for received data frames based on the received synchronization codes; and
i) sending individual received data frames with a correct framing bit across the first network.

32. An apparatus for enhancing frame synchronization comprising:
a) means for receiving data frames including a framing bit and data from a first network;
b) means for generating a synchronization code;
c) means for forming transport frames encapsulating data frames and synchronization codes;
d) means for sending the transport frames over a second network to a third network;
e) the synchronization codes generated to facilitate synchronization of the data frames when extracted from the transport frames and sent over the third network;
f) means for receiving transport frames from the second network;
g) means for extracting received data frames, framing bits, and synchronization codes from the received transport frames;
h) means for correcting framing errors for received data frames based on the received synchronization codes; and
i) means for sending individual received data frames with a correct framing bit across the first network.

* * * * *